United States Patent
Fukaumi et al.

(10) Patent No.: US 10,040,907 B2
(45) Date of Patent: Aug. 7, 2018

(54) METHOD FOR PRODUCING SILOXANE RESIN

(71) Applicant: Kaneka Corporation, Osaka (JP)

(72) Inventors: Hiroki Fukaumi, Hyogo (JP); Shinji Kagitani, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/474,142

(22) Filed: Mar. 30, 2017

(65) Prior Publication Data

US 2017/0204226 A1    Jul. 20, 2017

Related U.S. Application Data

(63) Continuation of application No. PCT/JP2015/077337, filed on Sep. 28, 2015.

(30) Foreign Application Priority Data

Sep. 30, 2014  (JP) .................. 2014-199851

(51) Int. Cl.
  *C07F 7/04*  (2006.01)
  *C08G 77/08*  (2006.01)

(52) U.S. Cl.
  CPC .................. *C08G 77/08* (2013.01)

(58) Field of Classification Search
  CPC ........................................ C08G 77/08
  USPC ........................................ 556/456
  See application file for complete search history.

(56) References Cited

U.S. PATENT DOCUMENTS

| | | | |
|---|---|---|---|
| 4,550,152 A * | 10/1985 | Faltynek | C07F 15/04 524/861 |
| 5,605,997 A | 2/1997 | Yamamoto et al. | |
| 5,650,474 A | 7/1997 | Yamaya et al. | |
| 5,883,214 A | 3/1999 | Wipfelder et al. | |
| 6,703,442 B1 * | 3/2004 | Ando | C08G 59/4085 524/115 |
| 2003/0176614 A1 | 9/2003 | Hacker et al. | |
| 2005/0003215 A1 | 1/2005 | Hacker et al. | |
| 2010/0146864 A1 | 6/2010 | Nakayama et al. | |

FOREIGN PATENT DOCUMENTS

| | | |
|---|---|---|
| EP | 1178070 A2 | 2/2002 |
| JP | S5127000 A | 3/1976 |
| JP | H07-292108 A | 11/1995 |
| JP | H08-104753 A | 4/1996 |
| JP | H09501964 A | 2/1997 |
| JP | 2002-265605 A | 9/2002 |
| JP | 2008-037101 A | 2/2008 |
| WO | 2007/018069 A1 | 2/2007 |

OTHER PUBLICATIONS

International Search Report and Written Opinion dated Oct. 27, 2015, issued by the Japan Patent Office in corresponding International Application No. PCT/JP2015/077337, with English translation (12 pages).
International Preliminary Report on Patentability dated Apr. 4, 2017, by the International Bureau of WIPO in corresponding International Application No. PCT/JP2015/077337, with English translation (8 pages).
Extended European Search Report issued in European Application No. 15846569.0, dated Apr. 11, 2018 (6 pages).

* cited by examiner

*Primary Examiner* — Clinton Brooks
*Assistant Examiner* — Kofi Adzamli
(74) *Attorney, Agent, or Firm* — Osha Liang LLP

(57) ABSTRACT

A method for producing a siloxane resin, by hydrolyzing and condensing a silane compound containing a hydrolyzable silyl group represented by $R_nSiX_{4-n}$ using a neutral salt as a catalyst. In the formula $R_nSiX_{4-n}$, R represents an organic group having a carbon atom directly bonded to Si, X represents a hydroxyl group or a hydrolyzable group, and n represents an integer of 0 to 3, provided that when n is 2 or greater each R may be the same as or different from each other, and when (4-n) is 2 or greater, each X may be the same as or different from each other.

18 Claims, No Drawings

US 10,040,907 B2

METHOD FOR PRODUCING SILOXANE RESIN

TECHNICAL FIELD

One or more embodiments of the present invention relate to a method for producing a condensate of a silane compound containing a hydrolyzable silyl group without using any acid or base catalyst.

BACKGROUND

Studies have been made to synthesize condensates through hydrolysis-condensation reactions using sol-gel methods in which silane compounds containing hydrolyzable silyl groups are used as starting materials.

Such condensates have been used in hard coating agents for plastic or ceramic materials, protective films for liquid crystal display elements, electric insulating materials for semiconductors, curing agents for coating materials, and other applications.

Compounds containing silicon are exceptional among metal alkoxide precursors in that they are less likely to undergo hydrolysis and condensation. For this reason, in condensation reactions of silane compounds containing hydrolyzable silyl groups, acids or bases are used as catalysts to accelerate the reactions to shorten the reaction time.

For example, Patent Literature 1 discloses a method for producing an alkoxysilane condensate from a tetrafunctional alkoxysilane such as tetraethoxysilane as a starting material in the presence of an acid catalyst. Patent Literature 2 also discloses a production method including hydrolyzing and condensing a trifunctional organic alkoxysilane such as vinyltrimethoxysilane in the presence of a basic catalyst.

As described above, a typical sol-gel method uses an acid or base catalyst to accelerate hydrolysis and condensation. However, many acid and base substances are corrosive substances which require technical considerations on corrosion of reaction equipment or storage equipment. In practice, the method often needs removal or neutralization of such an acid or base substance after the synthesis. However, it is not easy to completely remove the acid or base, and that even in the case of neutralization, the process becomes complicated and the amount of impurities is increased (see Patent Literature 3).

When a silane compound containing a highly active organic functional group such as an epoxy group is hydrolyzed and condensed, the acid or base catalyst used may destroy and deactivate the organic functional group.

Patent Literature 4 reports a technique by using a neutral fluoride salt as a catalyst. However, the term "neutral" as used in this patent literature does not mean that the pH of an aqueous solution of the fluoride salt itself is neutral, but merely means that the counter ions of the fluoride ions generated by dissolution of the fluoride salt in water are ions other than hydrogen ions. In fact, many aqueous fluoride salt solutions are weakly acidic. Also, many fluoride salts are known to generate highly toxic hydrofluoric acid in acidic aqueous solutions. Furthermore, silanols formed in the reaction may accelerate the generation of hydrofluoric acid.

On the other hand, in low reactivity conditions as in the absence of catalysts, the condensation reaction proceeds slowly and the hydrolysis and condensation take much time. Thus, it is difficult to obtain a condensate of a silane compound containing an organic functional group with low hydrolysis resistance, such as an epoxy group, without deactivating the organic functional group. Also, during the reaction, the presence of silanols may acidize the system to accelerate the hydrolysis of the organic functional group.

CITATION LIST

Patent Literature

Patent Literature 1: JP 2002-265605 A
Patent Literature 2: JP 2008-37101 A
Patent Literature 3: WO 2007/18069
Patent Literature 4: JP H07-292108 A

SUMMARY

One or more embodiments of the present invention provide for rapidly producing condensates of various silane compounds containing different organic functional groups by accelerating condensation reactions of the silane compounds containing hydrolyzable silyl groups without using acid or base catalysts.

As a result of studies to solve the above conventional drawbacks, the inventors have found the following solutions.

The following shows aspects of one or more embodiments of the present invention.

[1] A method for producing a siloxane resin, including
hydrolyzing and condensing a silane compound (B) containing a hydrolyzable silyl group represented by formula (I) below using a neutral salt (A) as a catalyst,
the formula (I) being $R_nSiX_{4-n}$ wherein R represents an organic group having a carbon atom directly bonded to Si; X represents a hydroxyl group or a hydrolyzable group; and n represents an integer of 0 to 3, provided that when n is 2 or greater, each R may be the same as or different from each other, and when (4-n) is 2 or greater, each X may be the same as or different from each other.

[2] The method for producing a siloxane resin according to the aspect [1],
wherein the neutral salt (A) is a salt formed by combining a cation selected from the group consisting of Group 1 element ions, Group 2 element ions, tetraalkylammonium ions, and guanidium ions with an anion selected from the group consisting of sulfate ions, nitrate ions, perchlorate ions, and Group 17 element ions excluding fluoride ions.

[3] The method for producing a siloxane resin according to the aspect [2],
wherein the cation is a Group 1 element ion or a Group 2 element ion, and the anion is a chloride ion, a bromide ion, or an iodide ion.

[4] The method for producing a siloxane resin according to any one of the aspects [1] to [3],
wherein the silane compound (B) is a silane compound of formula (I) wherein R is an organic group containing a cyclic ether group.

[5] The method for producing a siloxane resin according to any one of the aspects [1] to [4], further including adding a cyclic ether compound (C).

[6] The method for producing a siloxane resin according to any one of the aspects [1] to [5], further including adding an alcohol or ether as a diluting solvent (D).

[7] The method for producing a siloxane resin according to the aspect [6],
wherein the diluting solvent (D) is a water-soluble alcohol or a water-soluble ether.

[8] The method for producing a siloxane resin according to any one of the aspects [1] to [7], wherein the method includes reacting the silane compound (B) at a concentration in the reaction system of 90% by mass or less in the presence of 0.4 to 10 mol of water and 0.000001 to 0.1 mol of the neutral salt (A), each per mol of the hydrolyzable silyl group of the silane compound (B), by heating the reaction mixture to a temperature of 40° C. to 200° C., and the resulting resin has a polystyrene equivalent weight average molecular weight of 500 to 30000.

[9] The method for producing a siloxane resin according to any one of the aspects [1] to [8], wherein an initial molar amount A of SiX and a molar amount B of SiX remaining after the reaction without contributing to the condensation satisfy the condition (B/A) ≤0.2.

The production method according to one or more embodiments of the present invention can rapidly produce condensates of various silane compounds containing different organic substituents by accelerating condensation reactions of the silane compounds containing hydrolyzable silyl groups without using acid or base catalysts.

DESCRIPTION OF EMBODIMENTS

One or more embodiments of the present invention relate to a method for producing a siloxane resin, including hydrolyzing and condensing a silane compound (B) containing a hydrolyzable silyl group represented by formula (I) below using a neutral salt (A) as a catalyst, the formula (I) being $R_nSiX_{4-n}$ wherein R represents an organic group having a carbon atom directly bonded to Si; X represents a hydroxyl group or a hydrolyzable group; and n represents an integer of 0 to 3, provided that when n is 2 or greater, each R may be the same as or different from each other, and when (4−n) is 2 or greater, each X may be the same as or different from each other.

(A) Neutral Salt

In the production method according to one or more embodiments of the present invention, the use of a neutral salt as a catalyst allows for the production of a siloxane resin without deactivating its organic substituent before and after the hydrolysis-condensation reaction and during storage.

Since the neutral salt catalyst itself does not affect the production vessel and the storage vessel, the method can be applied without being restricted by the materials of production and storage equipments.

This is because, in general, acid or base catalysts themselves undergo electrophilic or nucleophilic reactions with various substances and also change the concentration of hydrogen ions or hydroxide ions in the reaction solution to allow the ions to contribute to the reaction, whereas neutral salts have extremely low activity for these reactions.

Moreover, when an acid or base catalyst is used in a hydrolysis-condensation reaction, an acid or base removal or neutralization step is required for the above reason. These steps are complex and decrease yield. A neutral salt catalyst may be used in this regard because the need for these steps can be eliminated.

The neutral salt (A) used in one or more embodiments of the present invention refers to a normal salt formed from a strong acid and a strong base, and may be a salt formed by combining a cation selected from the group consisting of Group 1 element ions, Group 2 element ions, tetraalkylammonium ions, and guanidium (guanidinium) ions with an anion selected from the group consisting of sulfate ions, nitrate ions, perchlorate ions, and Group 17 element ions excluding fluoride ions.

Examples of the neutral salt (A) include:

lithium chloride, sodium chloride, potassium chloride, rubidium chloride, cesium chloride, francium chloride, beryllium chloride, magnesium chloride, calcium chloride, strontium chloride, barium chloride, radium chloride, tetramethylammonium chloride, tetraethylammonium chloride, tetrapropylammonium chloride, tetrabutylammonium chloride, tetrapentylammonium chloride, tetrahexylammonium chloride, and guanidium chloride;

lithium bromide, sodium bromide, potassium bromide, rubidium bromide, cesium bromide, francium bromide, beryllium bromide, magnesium bromide, calcium bromide, strontium bromide, barium bromide, radium bromide, tetramethylammonium bromide, tetraethylammonium bromide, tetrapropylammonium bromide, tetrabutylammonium bromide, tetrapentylammonium bromide, tetrahexylammonium bromide, and guanidium bromide;

lithium iodide, sodium iodide, potassium iodide, rubidium iodide, cesium iodide, francium iodide, beryllium iodide, magnesium iodide, calcium iodide, strontium iodide, barium iodide, radium iodide, tetramethylammonium iodide, tetraethylammonium iodide, tetrapropylammonium iodide, tetrabutylammonium iodide, tetrapentylammonium iodide, tetrahexylammonium iodide, and guanidium iodide;

lithium sulfate, sodium sulfate, potassium sulfate, rubidium sulfate, cesium sulfate, francium sulfate, beryllium sulfate, magnesium sulfate, calcium sulfate, strontium sulfate, barium sulfate, radium sulfate, tetramethylammonium sulfate, tetraethylammonium sulfate, tetrapropylammonium sulfate, tetrabutylammonium sulfate, tetrapentylammonium sulfate, tetrahexylammonium sulfate, and guanidium sulfate;

lithium nitrate, sodium nitrate, potassium nitrate, rubidium nitrate, cesium nitrate, francium nitrate, beryllium nitrate, magnesium nitrate, calcium nitrate, strontium nitrate, barium nitrate, radium nitrate, tetramethylammonium nitrate, tetraethylammonium nitrate, tetrapropylammonium nitrate, tetrabutylammonium nitrate, tetrapentylammonium nitrate, tetrahexylammonium nitrate, and guanidium nitrate; and lithium perchlorate, sodium perchlorate, potassium perchlorate, rubidium perchlorate, cesium perchlorate, francium perchlorate, beryllium perchlorate, magnesium perchlorate, calcium perchlorate, strontium perchlorate, barium perchlorate, radium perchlorate, tetramethylammonium perchlorate, tetraethylammonium perchlorate, tetrapropylammonium perchlorate, tetrabutylammonium perchlorate, tetrapentylammonium perchlorate, tetrahexylammonium perchlorate, and guanidium perchlorate.

These neutral salts may be used alone or in combinations of two or more.

For use as a catalyst, the anion of the neutral salt may be a Group 17 element ion, such as a chloride ion, bromide ion, or iodide ion, because of high nucleophilicity.

The cation may be a Group 1 element ion or Group 2 element ion because it needs to be non-bulky to avoid inhibition of the nucleophilic action.

Salts formed by combining a cation selected from the group consisting of Group 1 element ions and Group 2 element ions with an anion selected from the group consisting of chloride ions, bromide ions, and iodide ions may be used.

Further, from the standpoints of availability and safety in handling, the neutral salt may be lithium chloride, sodium chloride, potassium chloride, rubidium chloride, cesium chloride, magnesium chloride, calcium chloride, strontium chloride, lithium bromide, sodium bromide, potassium bromide, rubidium bromide, cesium bromide, magnesium bromide, calcium bromide, strontium bromide, lithium iodide, sodium iodide, potassium iodide, rubidium iodide, cesium iodide, magnesium iodide, calcium iodide, or strontium iodide.

The amount of the neutral salt (A) used in one or more embodiments of the present invention may be 0.000001 mol or more, such as 0.000005 mol or more, such as 0.1 mol or less, such as 0.05 mol or less, or such as 0.01 mol or less, per mol of the hydrolyzable silyl group of the silane compound (B).

If the amount of the neutral salt (A) is less than 0.000001 mol, the hydrolysis-condensation reaction of the silane compound (B) may not readily proceed. If the amount is more than 0.1 mol, the neutral salt (A) may affect the transparency of the resulting condensate and the purification step.

(B) Silane Compound Containing Hydrolyzable Silyl Group

The silane compound (B) containing a hydrolyzable silyl group used in one or more embodiments of the present invention is represented by the following formula (I):

$$R_n SiX_{4-n}.$$

In the organic silicon compound represented by formula (I), R and X are defined as follows.

R represents an organic group having a carbon atom directly bonded to the Si in the formula. The symbol n represents an integer of 0 to 3, provided that when n is 2 or greater, each R may be the same as or different from each other. The symbol n may be 0 to 2, such as 1 or 2.

X represents a hydroxyl group or a hydrolyzable group. When (4−n) in formula (I) is 2 or greater, each X may be the same as or different from each other.

R may be an alkyl or alkenyl group which may contain a substituent.

Examples of the alkyl group include methyl, ethyl, propyl, isopropyl, butyl, isobutyl, amyl, isoamyl, hexyl, cyclohexyl, cyclohexylmethyl, cyclohexylethyl, heptyl, isoheptyl, n-octyl, isooctyl, and 2-ethylhexyl groups. Examples of the alkenyl group include vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, heptenyl, octenyl, nonyl, decenyl, bicyclohexenyl, pentadecenyl, eicosenyl, and tricosenyl groups.

The number of carbon atoms in the alkyl or alkenyl group may be 1 to 10.

Examples of the substituent which may be contained in R in formula (I) include mercapto, isocyanate, glycidyl ether, epoxycyclohexyl, (meth)acryloyl, and oxetanyl groups. Among these, those containing cyclic ether groups may be used because the oxygen atom thereof acts as a nucleophilic group to aid the catalytic activity of the neutral salt. Further, glycidyl ether, epoxycyclohexyl, and oxetanyl groups may be used.

When an amino group or acid anhydride group is present as the substituent, on the other hand, it does not cause any problem in the hydrolysis-condensation reaction, but such a substituent itself functions as an acid or base catalyst and is therefore not appropriate for use in one or more embodiments of the present invention characterized by not using any acid or base catalyst.

In the production method, when two or more types of silane compounds (B) are used as starting materials, at least one silane compound of formula (I) in which R is an organic group containing a cyclic ether group may be used. The proportion of the silane compound of formula (I) in which R is an organic group containing a cyclic ether group may be 0.1 to 100 mol %, such as 0.1 to 99.9 mol %, such as 1.0 to 99 mol %, based on 100 mol % of the total amount of the silane compound (B).

R only has to substantially contain a cyclic ether group. The hydrolysis-condensation reaction of the hydrolyzable silyl group is sufficiently accelerated as long as the total silane compound (B) used as a starting material includes 0.1 mol % or higher of the silane compound in which R contains a cyclic ether group.

The use of the neutral salt described herein can allow the reaction of the hydrolyzable silyl group to be accelerated without such a silane compound in which R is an organic group containing a cyclic ether group. Still, the silane compound in which R is an organic group containing a cyclic ether group is useful for shortening the reaction time.

However, when it is desired for the resulting condensate to show the characteristics of an organic substituent other than cyclic ether groups, a smaller amount of cyclic ether groups may be used in many cases.

The hydrolyzable silyl group as used in one or more embodiments of the present invention refers to SiX in formula (I). For example, a compound represented by the formula $RSiX_3$ contains 3 mol of hydrolyzable silyl groups per mol of the compound.

The hydrolyzable group as used in one or more embodiments of the present invention refers to a group that can be hydrolyzed to form a silanol group or a siloxane condensate, for example, when it is heated at 25° C. to 100° C. in the presence of an excess of water without any catalyst.

Examples of the hydrolyzable group include alkoxy, acyloxy, halogen, and isocyanate groups. Since the silyl group needs to come close to a water molecule to some extent in order to undergo a hydrolysis reaction, C1-C4 alkoxy groups or C1-C4 acyloxy groups may be used from steric and hydrophilic standpoints.

Examples of the C1-C4 alkoxy group include methoxy, ethoxy, n-propoxy, isopropoxy, n-butoxy, sec-butoxy, and t-butoxy groups. Examples of the C1-C4 acyloxy group include formyloxy, acetyloxy, and propanoyloxy groups.

Examples of the silane compound (B) containing a hydrolyzable silyl group include tetramethoxysilane, tetraethoxysilane, tetraisopropoxysilane, methyltrichlorosilane, ethyltrichlorosilane, butyltrichlorosilane, methyltrimethoxysilane, methyltriethoxysilane, methyltriisopropoxysilane, methyltributoxysilane, ethyltrimethoxysilane, ethyltriethoxysilane, ethyltriisopropoxysilane, ethyltributoxysilane, butyltrimethoxysilane, butyltriethoxysilane, butyltriisopropoxysilane, butyltributoxysilane, hexyltrimethoxysilane, hexyltriethoxysilane, hexyltriisopropoxysilane, hexyltributoxysilane, decyltrimethoxysilane, decyltriethoxysilane, decyltriisopropoxysilane, decyltributoxysilane, pentafluorophenyltrimethoxysilane, phenyltrimethoxysilane, phenyltriethoxysilane, nonafluorobutylethyltrimethoxysilane, trifluoromethyltrimethoxysilane, trifluoroethyltrimethoxysilane, trifluoropropyltrimethoxysilane, trifluorobutyltrimethoxysilane, dibutyldiacetoxysilane, dibutyldimethoxysilane, diphenyldimethoxysilane, diphenyldiethoxysilane, dibutyldimethoxysilane, tributylchlorosilane, vinyltrimethoxysilane, vinyltriethoxysilane, vinyltriisopropoxysilane, 3-(meth)acryloxypropyltrimethoxysilane, 3-(meth)acryloxypropyltriethoxysilane, 3-(meth)acryloxypropyltriisopropoxysilane, 3-(meth)acryloxypropylmethyldimethoxysilane, 3-(meth)acryloxypropylmethyldiethoxysilane, 3-(meth)acryloxypropylmethyldiisopropoxysilane, 3-(meth)acryloxypropylethyldimethoxysilane, 3-(meth)acryloxypropylethyldiethoxysilane, 3-(meth)

acryloxypropylethyldiisopropoxysilane, 3-(meth)acryloxypropylbutyldimethoxysilane, 3-(meth)acryloxypropylbutyldiethoxysilane, 3-(meth)acryloxypropylbutyldiisopropoxysilane, γ-glycidoxypropyltrimethoxysilane, γ-glycidoxypropyltriethoxysilane, γ-glycidoxypropyltriisopropoxysilane, γ-glycidoxypropylmethyldimethoxysilane, γ-glycidoxypropylmethyldiethoxysilane, γ-glycidoxypropylmethyldiisopropoxysilane, γ-glycidoxypropylethyldimethoxysilane, γ-glycidoxypropylethyldiethoxysilane, γ-glycidoxypropylethyldiisopropoxysilane, γ-glycidoxypropylbutyldimethoxysilane, γ-glycidoxypropylbutyldiethoxysilane, γ-glycidoxypropylbutyldiisopropoxysilane, 3-(3-butyl-3-oxetanemethoxy)propyltrimethoxysilane, 3-(3-butyl-3-oxetanemethoxy)propyltriethoxysilane, 3-(3-butyl-3-oxetanemethoxy)propylmethyldimethoxysilane, 3-(3-butyl-3-oxetanemethoxy)propylmethyldiethoxys 3-(3-butyl-3-oxetanemethoxy)propylethyldimethoxys 3-(3-butyl-3-oxetanemethoxy)propylethyldiethoxysilane, 2-(3,4-epoxycyclohexyl)ethyltrimethoxysilane, 2-(3,4-epoxycyclohexyl)ethyltriethoxysilane, 2-(3,4-epoxycyclohexyl)ethylmethyldimethoxysilane, 2-(3,4-epoxycyclohexyl)ethylmethyldiethoxysilane, 2-(3,4-epoxycyclohexyl)propyltrimethoxysilane, 2-(3,4-epoxycyclohexyl)propyltriethoxysilane, 2-(3,4-epoxycyclohexyl)propylmethyldimethoxysilane, 2-(3,4-epoxycyclohexyl)propylmethyldiethoxysilane, γ-mercaptopropyltrimethoxysilane, γ-mercaptopropyltriethoxysilane, γ-mercaptopropyltriisopropoxysilane, γ-mercaptopropylmethyldimethoxysilane, γ-mercaptopropylmethyldiethoxysilane, γ-mercaptopropylmethyldiisopropoxysilane, γ-mercaptopropylethyldimethoxysilane, γ-mercaptopropylethyldiethoxysilane, γ-mercaptopropylethyldiisopropoxysilane, γ-mercaptopropylbutyldimethoxysilane, γ-mercaptopropylbutyldiethoxysilane, γ-mercaptopropylbutyldiisopropoxysilane, γ-isocyanatopropyltrimethoxysilane, γ-isocyanatopropyltriethoxysilane, γ-isocyanatopropyltriisopropoxysilane, γ-isocyanatopropylmethyldimethoxysilane, γ-isocyanatopropylmethyldiethoxysilane, γ-isocyanatopropylmethyldiisopropoxysilane, γ-isocyanatopropylethyldimethoxysilane, γ-isocyanatopropylethyldiethoxysilane, γ-isocyanatopropylethyldiisopropoxysilane, γ-isocyanatopropylbutyldimethoxysilane, γ-isocyanatopropylbutyldiethoxysilane, γ-isocyanatopropylbutyldiisopropoxysilane, (meth)acryloxysilane, butyl[2-(meth)acryloxyethoxy]silane, butyltriglycidyloxysilane, butyltris(3-butyl-3-oxetanemethoxy)silane, 3-[(3-ethyloxetan-3-yl)methoxy]propyltrimethoxysilane, and 3-[(3-ethyloxetan-3-yl)methoxy]propyltriethoxysilane.

These silane compounds (B) may be used alone or in combinations of two or more.

The silane compound (B) containing a hydrolyzable silyl group used in one or more embodiments of the present invention may be in the form of a condensate of the silane compound (B) as long as SiX remains in the condensate.

(C) Cyclic Ether

According to one or more embodiments of the present invention, a cyclic ether compound (C) may further be added. When the silane compound (B) as a starting material does not contain a cyclic ether group as a substituent in R, the cyclic ether (C) may be further added because the oxygen atom thereof acts as a nucleophilic group to aid the catalytic activity of the neutral salt.

Although the oxygen atom in a linear ether compound can also act as a nucleophilic group, the cyclic ether (C) is more suitable as it has higher polarity than linear ether compounds and provides enhanced co-catalytic effect due to its structure with constrained alkyl groups on both sides of the oxygen atom, which causes less steric repulsion and allows the oxygen atom to be exposed.

The cyclic ether compound (C) used in one or more embodiments of the present invention refers to an ether having a structure in which at least one of the carbon atoms in a cyclic hydrocarbon is replaced by an oxygen atom. Examples include compounds containing epoxy, oxetane, tetrahydrofuran, tetrahydropyran, or dioxane.

The cyclic ether compound (C) may have a boiling point of at least 40° C. but not more than 200° C., such as at least 50° C. but not more than 200° C., such as at least 60° C. but not more than 150° C., or such as at least 60° C. but not more than 130° C.

If the cyclic ether compound (C) has a boiling point of less than 40° C., reflux tends to occur at low temperatures to hinder the reaction. If the boiling point is more than 200° C., the cyclic ether compound (C) tends to be difficult to remove after the reaction.

Examples of the cyclic ether compound (C) may include tetrahydrofuran, 2-methyltetrahydrofuran, dihydrofuran, tetrahydropyran, 3-ethyl-3-hydroxymethyloxetane, 3-ethyl-3{[(3-ethyloxetan-3-yl)methoxy]methyl}oxetane, dioxane, 1,2-epoxycyclohexane, 1,2-epoxy-4-vinylcyclohexane, limonenedioxide, limonenemonooxide, α-pyrene oxide, ethyl glycidyl ether, methyl glycidyl ether, pentylene oxide, hexylene oxide, butylene oxide, and 1,3-dioxolane. These compounds may be used alone or in combinations of two or more.

The cyclic ether compound (C) may be added in an amount of at least 0 parts by weight but not more than 100 parts by weight, such as at least 0 parts by weight but not more than 90 parts by weight, such as at least 0 parts by weight but not more than 80 parts by weight, such as at least 0 parts by weight but not more than 70 parts by weight, or such as at least 0 parts by weight but not more than 50 parts by weight, relative to 100 parts by weight of the silane compound (B).

Since the cyclic ether compound (C) acts as a diluting solvent while accelerating the reaction, the cyclic ether compound (C) in an amount of more than 100 parts by weight may decrease the concentration of the silane compound (B).

(D) Diluting Solvent

In the production method, a diluting solvent may be further used.

The diluting solvent (D) may be an alcohol or an ether (excluding the cyclic ether compound (C)), such as a water-soluble one. This is because since many silane compounds (B) that can be used have low compatibility with the neutral salt (A) or water used in the hydrolysis.

Ketone or ester solvents, on the other hand, are not suitable because they contain a carbonyl group and can easily hinder the reaction.

The diluting solvent (D) may have a boiling point of at least 40° C. but not more than 200° C., such as at least 50° C. but not more than 200° C., such as at least 60° C. but not more than 150° C., or such as at least 60° C. but not more than 130° C.

If the diluting solvent (D) has a boiling point of less than 40° C., reflux tends to occur at low temperatures to hinder the reaction. If the boiling point is more than 200° C., the diluting solvent (D) may be difficult to remove after the reaction, resulting in the need to incorporate a complex step such as separation and extraction.

Examples of the diluting solvent (D) include methanol, ethanol, 1-propanol, 2-propanol, 2-butanol, 2-methyl-2-propanol, 1-methoxy-2-propanol, ethylene glycol monomethyl ether, ethylene glycol dimethyl ether, propylene glycol monomethyl ether, and propylene glycol dimethyl ether.

The compounds mentioned for the cyclic ether compound (C) can also act as diluting solvents.

These diluting solvents may be used alone or in combinations of two or more.

The amount of the diluting solvent used may be controlled to give a concentration of the silane compound (B) in the reaction system of 90% by mass or less, such as at least 30% by mass but not more than 80% by mass, or such as at least 40% by mass but not more than 80% by mass.

The concentration of the silane compound (B) can be controlled by varying the amount of water, the diluting solvent (D), or the cyclic ether compound (C). If the amount of the diluting solvent (D) or cyclic ether compound (C) is excessive, the concentration of the silane compound (B) in the reaction system may be reduced, resulting in a decrease in reaction rate. However, they are also expected to enhance the compatibility between water and the silane compound (B) and to reduce an increase in viscosity in the system resulting from the reaction, thereby reducing deterioration of the reaction rate. Thus, it is important to select an appropriate amount.

Method for Producing Siloxane Resin

The production method may include reacting the silane compound (B) at a concentration in the reaction system of 90% by mass or less in the presence of 0.4 to 10 mol of water and 0.000001 to 0.1 mol of the neutral salt (A), each per mol of the hydrolyzable silyl group of the silane compound (B), by heating the reaction mixture to a temperature of 40° C. to 200° C., and the resulting resin has a polystyrene equivalent weight average molecular weight of 500 to 30000.

The hydrolysis-condensation reaction of the silane compound (B) containing a hydrolyzable silyl group in the presence of the neutral salt (A) according to one or more embodiments of the present invention is carried out, for example, as follows.

The neutral salt (A) is dissolved with stirring in water used for hydrolysis. The silane compound (B), and optionally the cyclic ether compound (C) and diluting solvent (D) are sequentially slowly added with stirring to the solution. After completion of the addition, the mixture is heated and reacted.

The amount of water used in the production method may be 0.4 to 10 mol, such as 0.45 to 3 mol, or such as 0.45 to 1 mol, per mol of the hydrolyzable silyl group of the silane compound (B).

If the amount of water used is less than 0.4 mol, some hydrolyzable groups may remain without being hydrolyzed, with the result that the above condition (1) cannot be satisfied. If the amount of water is greater than 10 mol, the hydrolysis-condensation reaction may proceed at an excessively high rate so that a high molecular weight condensate can be formed, resulting in reduced transparency.

For safety in the production, the production method may be carried out with refluxing of the diluting solvent and alcohol or other products generated in the hydrolysis.

The reaction temperature in the production method may be in the range of 40° C. to 200° C., such as 50° C. to 150° C., or such as 60° C. to 130° C.

If the reaction temperature is lower than 40° C., the catalytic activity of the neutral salt tends to decrease, resulting in a great increase in reaction time. If the reaction temperature is higher than 200° C., the organic substituent may be deactivated through a side reaction.

The siloxane resin which is a condensate obtained by the production method may be a dimer to 100-mer obtained by hydrolysis and condensation of the silane compound to form a siloxane bond.

The siloxane resin (condensate) obtained by the production method may have a weight average molecular weight of at least 500 but not more than 30000, such as at least 1000 but not more than 18000, such as at least 1000 but not more than 15000.

If the siloxane resin has a weight average molecular weight of less than 500, it may be volatile and can volatilize in the devolatilization process as well as during use. If the siloxane resin has a weight average molecular weight of more than 30000, it may have poor workability due to high viscosity, and may show reduced compatibility with solvents and other resins leading to white turbidity.

The weight average molecular weight is measured by GPC calibrated with polystyrene standards.

The weight average molecular weight of the siloxane resin can be controlled by appropriately selecting the amount of water and the type of catalyst used in the reaction. For example, the weight average molecular weight may be raised by increasing the amount of water initially charged.

The number of hydrolyzable groups remaining in the siloxane resin (condensate) obtained by the production method may be 2 or less, such as 1 or less, such as 0.5 or less, such as 0.1 or less, or zero, per molecule.

In the production method, the ratio (B/A) of the molar amount (B) of SiX remaining after the reaction without contributing to the condensation reaction to the initial molar amount (A) of SiX in the component (B) may be 0.2 or less, msuch as 0.1 or less, such as 0.05 or less, or may be substantially 0.

f the ratio B/A is more than 0.2, the SiX remaining in the siloxane resin may react with, e.g., moisture in the air over time, resulting in changes in physical properties such as viscosity during storage.

The SiX remaining after the reaction refers to the SiX present in the condensate and the SiX of the unreacted silane compound (B). The ratio B/A can be determined by $^1$H-NMR and $^{29}$Si-NMR.

The ratio B/A can be adjusted to 0.2 or less by appropriately selecting the amount of water and the type and amount of the catalyst used in the reaction. For example, a larger amount of water results in more acceleration of hydrolysis and therefore a smaller B/A ratio.

When the silane compound (B) contains a highly active organic functional group, the ratio of the organic functional groups remaining in the condensate (siloxane resin) obtained by the production method ([the amount of the organic functional group present in the siloxane resin]/[the amount of the organic functional group present in the silane compound (B) used]) may be 20% or higher, such as 40% or higher, or such as 60% or higher, in order to increase the reactivity of a curable composition containing the condensate.

Herein, the highly active organic functional group means a functional group that undergoes a reaction within 24 hours in an atmosphere at a temperature of approximately 0 to 100° C. when it is mixed with an acidic substance having an acid strength equal to or greater than that of hydrochloric acid or sulfuric acid, or with a basic compound having a base strength equal to or greater than that of alkylamines Examples of the highly active organic functional group include epoxy, oxetanyl, (meth)acryloyl, alkenyl, and mercapto groups.

The ratio of the remaining organic functional groups can be determined by $^1$H-NMR.

EXAMPLES

One or more embodiments of the present invention are described below with reference to examples which are not intended to limit the scope of the present invention.

The materials used in the examples and comparative examples are shown below.

Silane Compound (B) Containing Hydrolyzable Silyl Group

A-186: Momentive Performance Materials Japan, 2-(3,4-epoxycyclohexyl)ethyltrimethoxysilane, molecular weight 246

A-187: Momentive Performance Materials Japan,3-glycidoxypropyltrimethoxysilane, molecular weight 236

A-174: Momentive Performance Materials Japan, 3-methacryloxypropyltrimethoxysilane, molecular weight 290

A-171: Momentive Performance Materials Japan, vinyltrimethoxysilane, molecular weight 148

KBM-3063: Shin-Etsu Chemical Co., Ltd., hexyltrimethoxysilane, molecular weight 206

Neutral Salt (A)

Sodium chloride (Wako Pure Chemical Industries, Ltd., guaranteed reagent, molecular weight 58)

Lithium chloride (Wako Pure Chemical Industries, Ltd., guaranteed reagent, molecular weight 42)

Cesium chloride (Wako Pure Chemical Industries, Ltd., guaranteed reagent, molecular weight 168)

Potassium chloride (Wako Pure Chemical Industries, Ltd., guaranteed reagent, molecular weight 75)

Potassium bromide (Wako Pure Chemical Industries, Ltd., guaranteed reagent, molecular weight 119)

Potassium iodide (Wako Pure Chemical Industries, Ltd., guaranteed reagent, molecular weight 166)

Magnesium chloride (Wako Pure Chemical Industries, Ltd., guaranteed reagent, molecular weight 95)

Tetrabutylammonium chloride (Tokyo Chemical Industry Co., Ltd., guaranteed reagent, molecular weight 278)

Guanidium chloride (Junsei Chemical Co., Ltd., guaranteed reagent, molecular weight 95) Magnesium sulfate (Wako Pure Chemical Industries, Ltd., guaranteed reagent, molecular weight 120)

Sodium sulfate (Wako Pure Chemical Industries, Ltd., guaranteed reagent, molecular weight 142)

Cyclic Ether (C)

Epoxycyclohexane (Tokyo Chemical Industry Co., Ltd., guaranteed reagent, molecular weight 252)

Diluting Solvent (D)

1-Methoxy-2-propanol (Daicel Corporation, molecular weight 90)

Methanol (Mitsubishi Gas Chemical Company, Inc., molecular weight 32)

Others

Cesium fluoride (Wako Pure Chemical Industries, Ltd., guaranteed reagent, molecular weight 152)

Hydrochloric acid (Wako Pure Chemical Industries, Ltd., 0.01 mol/L)

Aqueous sodium hydroxide solution (Wako Pure Chemical Industries, Ltd., 0.01 mol/L)

The examples and comparative examples were evaluated as described below.

(Quantitative Determination of X Directly Bonded to Silicon)

The OR groups (alkoxy and hydroxyl groups) directly bonded to silicon in the silane compound (B) before the reaction and the OR groups directly bonded to silicon remaining after the reaction were measured to calculate the ratio B/A by the following method.

The ratio B/A was calculated using $^1$H-NMR and $^{29}$Si-NMR (JNM-LA400 available from JEOL Ltd) with deuterated acetone as the solvent.

(Determination of Weight Average Molecular Weight)

Weight average molecular weight was determined with a HLC-8220GPC liquid feed system available from Tosoh Corporation, a TSK-GEL H column available from Tosoh Corporation, and THF solvent and calibrated with polystyrene standards.

(Evaluation of Solubility in Various Solvents)

The obtained condensate (1 g) was dried in a 120° C. oven for one hour. Then, 10 g each of various solvents was added to visually determine whether or not the condensate was soluble in the solvents.

For those having a molecular weight of 1000 or less due to lack of condensation, however, the drying conditions were changed to 80° C. for 30 minutes in view of their high volatility.

(Evaluation of Ratio of Remaining Organic Functional Groups)

The obtained condensate was subjected to $^1$-NMR (JNM-LA400 available from JEOL Ltd.) with deuterated acetone as the solvent.

The ratio of the remaining epoxy groups for A-186 and A-187, methacryloyl groups for A-174, vinyl groups for A-171, or hexyl groups for KBM-3063 was analyzed.

Example 1

A reaction vessel such as a four-neck flask equipped with a stirrer, a thermometer, and a reflux condenser was charged with 100 parts by weight (pbw) of A-186 [2-(3,4-epoxycyclohexyl)ethyltrimethoxysilane] as a silane compound, 0.71 parts by weight (0.01 mol per mol of the hydrolyzable group in the silane compound) of sodium chloride as a catalyst, 11.0 parts by weight (0.5 mol per mol of the hydrolyzable group in the silane compound) of water, and 11.0 parts by weight of 1-methoxy-2-propanol as a diluting solvent. The mixture was reacted at a reaction temperature of 130° C. for three hours with stirring, whereby a condensate solution was prepared.

The results of weight average molecular weight, B/A ratio, ratio of remaining organic functional groups, and solubility in various solvents of the obtained condensate (siloxane resin) are shown in Table 1.

Example 2

A condensate solution was prepared by the same procedure as in Example 1, except for changing the amount of the catalyst, sodium chloride, introduced to 0.36 parts by weight (0.005 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 3

A condensate solution was prepared by the same procedure as in Example 1, except for changing the amount of the catalyst, sodium chloride, introduced to 0.07 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 4

A condensate solution was prepared by the same procedure as in Example 1, except for changing the amount of the catalyst, sodium chloride, introduced to 0.007 parts by weight (0.0001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 5

A condensate solution was prepared by the same procedure as in Example 1, except for changing the type and amount of the catalyst introduced to lithium chloride in an amount of 0.05 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 6

A condensate solution was prepared by the same procedure as in Example 1, except for changing the type and amount of the catalyst introduced to cesium chloride in an amount of 0.21 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 7

A condensate solution was prepared by the same procedure as in Example 1, except for changing the type and amount of the catalyst introduced to potassium chloride in an amount of 0.09 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 8

A condensate solution was prepared by the same procedure as in Example 1, except for changing the type and amount of the catalyst introduced to potassium bromide in an amount of 0.14 parts by weight (0.001 mol per mol of the hydrolyzable group in the silane compound). The results of weight average molecular weight, B/A ratio, ratio of remaining organic functional groups, and solubility in various solvents of the obtained condensate (siloxane resin) are shown in Table 1.

Example 9

A condensate solution was prepared by the same procedure as in Example 1, except for changing the type and amount of the catalyst introduced to potassium iodide in an amount of 0.20 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 10

A condensate solution was prepared by the same procedure as in Example 1, except for changing the type and amount of the catalyst introduced to magnesium chloride in an amount of 0.12 parts by weight (0.001 mol per mol of the hydrolyzable group in the silane compound).

The results of weight average molecular weight, B/A ratio, ratio of remaining organic functional groups, and solubility in various solvents of the obtained condensate (siloxane resin) are shown in Table 1.

Example 11

A condensate solution was prepared by the same procedure as in Example 1, except for changing the type and amount of the catalyst introduced to magnesium sulfate in an amount of 0.15 parts by weight (0.001 mol per mol of the hydrolyzable group in the silane compound), the amount of water introduced to 17.5 parts by weight (0.8 mol per mol of the hydrolyzable group in the silane compound), the amount of the diluting solvent introduced to 17.5 parts by weight, and the reaction time to 12 hours.

The results of weight average molecular weight, B/A ratio, ratio of remaining organic functional groups, and solubility in various solvents of the obtained condensate (siloxane resin) are shown in Table 1.

Example 12

A condensate solution was prepared by the same procedure as in Example 1, except for changing the type and amount of the catalyst introduced to sodium sulfate in an amount of 0.17 parts by weight (0.001 mol per mol of the hydrolyzable group in the silane compound), the amount of water introduced to 17.5 parts by weight (0.8 mol per mol of the hydrolyzable group in the silane compound), the amount of the diluting solvent introduced to 17.5 parts by weight, and the reaction time to 12 hours.

The results of weight average molecular weight, B/A ratio, ratio of remaining organic functional groups, and solubility in various solvents of the obtained condensate (siloxane resin) are shown in Table 1.

Example 13

A condensate solution was prepared by the same procedure as in Example 1, except for changing the type and amount of the catalyst introduced to tetrabutylammonium chloride in an amount of 0.36 parts by weight (0.001 mol per mol of the hydrolyzable group in the silane compound), the amount of water introduced to 11.0 parts by weight (0.5 mol per mol of the hydrolyzable group in the silane compound), the amount of the diluting solvent introduced to 11.0 parts by weight, and the reaction time to six hours.

The results of weight average molecular weight, B/A ratio, ratio of remaining organic functional groups, and solubility in various solvents of the obtained condensate (siloxane resin) are shown in Table 1.

Example 14

A condensate solution was prepared by the same procedure as in Example 1, except for changing the type and amount of the catalyst introduced to guanidium chloride in an amount of 0.12 parts by weight (0.001 mol per mol of the hydrolyzable group in the silane compound), the amount of water introduced to 11.0 parts by weight (0.5 mol per mol of the hydrolyzable group in the silane compound), the amount of the diluting solvent introduced to 11.0 parts by weight, and the reaction time to six hours.

The results of weight average molecular weight, B/A ratio, ratio of remaining organic functional groups, and solubility in various solvents of the obtained condensate (siloxane resin) are shown in Table 1.

TABLE 1

|  |  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Condensation reaction | Silane monomer | A-186 | pbw | 100 | 100 | 100 | 100 | 100 | 100 | 100 | 100 |
|  |  | A-174 | pbw |  |  |  |  |  |  |  |  |
|  |  | A-171 | pbw |  |  |  |  |  |  |  |  |
|  |  | A-187 | pbw |  |  |  |  |  |  |  |  |
|  |  | KBM-3063 | pbw |  |  |  |  |  |  |  |  |
|  | Cyclic ether | Epoxycyclohexane | pbw |  |  |  |  |  |  |  |  |
|  | Neutral salt | Sodium chloride | pbw | 0.71 | 0.36 | 0.07 | 0.007 |  |  |  |  |
|  |  | Lithium chloride | pbw |  |  |  |  | 0.05 |  |  |  |
|  |  | Cesium chloride | pbw |  |  |  |  |  | 0.21 |  |  |
|  |  | Potassium chloride | pbw |  |  |  |  |  |  | 0.09 |  |
|  |  | Potassium bromide | pbw |  |  |  |  |  |  |  | 0.14 |
|  |  | Potassium iodide | pbw |  |  |  |  |  |  |  |  |
|  |  | Magnesium chloride | pbw |  |  |  |  |  |  |  |  |
|  |  | Magnesium sulfate | pbw |  |  |  |  |  |  |  |  |
|  |  | Sodium sulfate | pbw |  |  |  |  |  |  |  |  |
|  |  | Tetrabutyl-ammonium chloride | pbw |  |  |  |  |  |  |  |  |
|  |  | Guanidium chloride | pbw |  |  |  |  |  |  |  |  |
|  | Water | Water | pbw | 11.0 | 11.0 | 11.0 | 11.0 | 11.0 | 11.0 | 11.0 | 11.0 |
|  |  | Cecium fluoride | pbw |  |  |  |  |  |  |  |  |
|  | Acid catalyst | Hydrochloric acid (0.01 mol/L) | pbw |  |  |  |  |  |  |  |  |
|  | Base catalyst | Aqueous sodium hydroxide (0.01 mol/L) | pbw |  |  |  |  |  |  |  |  |
|  | Diluting solvent | 1-Methoxy-2-propanol | pbw | 11.0 | 11.0 | 11.0 | 11.0 | 11.0 | 11.0 | 11.0 | 11.0 |
|  |  | Methanol | pbw |  |  |  |  |  |  |  |  |
|  | Reaction conditions | Reaction temperature | °C. | 130 | 130 | 130 | 130 | 130 | 130 | 130 | 130 |
|  |  | Reaction time | hr | 3 | 3 | 3 | 3 | 3 | 3 | 3 | 3 |
| Properties of condensate | Weight average molecular weight | — | 2200 | 2100 | 2200 | 1900 | 3100 | 3300 | 1900 | 3300 |
|  | B/A ratio |  | — | ≤0.2 | ≤0.2 | ≤0.2 | ≤0.2 | ≤0.2 | ≤0.2 | ≤0.2 | ≤0.2 |
|  | Ratio of remaining organic functional groups |  | — | >0.95 | >0.95 | >0.95 | >0.95 | >0.95 | >0.95 | >0.95 | >0.95 |
|  | Solubility in various solvents | Methanol | — | Insoluble | Insoluble | Insoluble | Insoluble | Insoluble | Insoluble | Insoluble | Insoluble |
|  |  | 2-Propanol | — | Insoluble | Insoluble | Insoluble | Insoluble | Insoluble | Insoluble | Insoluble | Insoluble |
|  |  | 1-Methoxy-2-propanol | — | Soluble | Soluble | Soluble | Soluble | Soluble | Soluble | Soluble | Soluble |
|  |  | Acetone | — | Soluble | Soluble | Soluble | Soluble | Soluble | Soluble | Soluble | Soluble |
|  |  | Methyl ethyl ketone | — | Soluble | Soluble | Soluble | Soluble | Soluble | Soluble | Soluble | Soluble |
|  |  | Methyl isobutyl ketone | — | Soluble | Soluble | Soluble | Soluble | Soluble | Soluble | Soluble | Soluble |
|  |  | Ethyl acetate | — | Soluble | Soluble | Soluble | Soluble | Soluble | Soluble | Soluble | Soluble |
|  |  | Butyl acetate | — | Soluble | Soluble | Soluble | Soluble | Soluble | Soluble | Soluble | Soluble |

|  |  |  |  | Ex. 9 | Ex. 10 | Ex. 11 | Ex. 12 | Ex. 13 | Ex. 14 |
|---|---|---|---|---|---|---|---|---|---|
| Condensation reaction | Silane monomer | A-186 | pbw | 100 | 100 | 100 | 100 | 100 | 100 |
|  |  | A-174 | pbw |  |  |  |  |  |  |
|  |  | A-171 | pbw |  |  |  |  |  |  |
|  |  | A-187 | pbw |  |  |  |  |  |  |
|  |  | KBM-3063 | pbw |  |  |  |  |  |  |
|  | Cyclic ether | Epoxycyclohexane | pbw |  |  |  |  |  |  |
|  | Neutral salt | Sodium chloride | pbw |  |  |  |  |  |  |
|  |  | Lithium chloride | pbw |  |  |  |  |  |  |
|  |  | Cesium chloride | pbw |  |  |  |  |  |  |
|  |  | Potassium chloride | pbw |  |  |  |  |  |  |
|  |  | Potassium bromide | pbw |  |  |  |  |  |  |
|  |  | Potassium iodide | pbw | 0.20 |  |  |  |  |  |
|  |  | Magnesium chloride | pbw |  | 0.12 |  |  |  |  |
|  |  | Magnesium sulfate | pbw |  |  | 0.15 |  |  |  |

TABLE 1-continued

|  |  |  | |  |  |  |  |  |  |
|---|---|---|---|---|---|---|---|---|---|
|  |  | Sodium sulfate | pbw |  |  |  |  | 0.17 |  |
|  |  | Tetrabutyl-ammonium chloride | pbw |  |  |  |  |  | 0.36 |
|  |  | Guanidium chloride | pbw |  |  |  |  |  | 0.12 |
|  | Water | Water | pbw | 11.0 | 11.0 | 17.5 | 17.5 | 11.0 | 11.0 |
|  |  | Cecium fluoride | pbw |  |  |  |  |  |  |
|  | Acid catalyst | Hydrochloric acid (0.01 mol/L) | pbw |  |  |  |  |  |  |
|  | Base catalyst | Aqueous sodium hydroxide (0.01 mol/L) | pbw |  |  |  |  |  |  |
|  | Diluting solvent | 1-Methoxy-2-propanol | pbw | 11.0 | 11.0 | 17.5 | 17.5 | 11.0 | 11.0 |
|  |  | Methanol | pbw |  |  |  |  |  |  |
|  | Reaction conditions | Reaction temperature | °C. | 130 | 130 | 130 | 130 | 130 | 130 |
|  |  | Reaction time | hr | 3 | 3 | 12 | 12 | 6 | 6 |
| Properties of condensate | Weight average molecular weight | | — | 3300 | 3300 | 6400 | 7800 | 5300 | 4800 |
|  | B/A ratio | | — | ≤0.2 | ≤0.2 | ≤0.2 | ≤0.2 | ≤0.2 | ≤0.2 |
|  | Ratio of remaining organic functional groups | | — | >0.95 | >0.95 | >0.95 | >0.95 | 0.8 | 0.8 |
|  | Solubility in various solvents | Methanol | — | Insoluble | Insoluble | Insoluble | Insoluble | Insoluble | Insoluble |
|  |  | 2-Propanol | — | Insoluble | Insoluble | Insoluble | Insoluble | Insoluble | Insoluble |
|  |  | 1-Methoxy-2-propanol | — | Soluble | Soluble | Soluble | Soluble | Soluble | Soluble |
|  |  | Acetone | — | Soluble | Soluble | Soluble | Soluble | Soluble | Soluble |
|  |  | Methyl ethyl ketone | — | Soluble | Soluble | Soluble | Soluble | Soluble | Soluble |
|  |  | Methyl isobutyl ketone | — | Soluble | Soluble | Soluble | Soluble | Soluble | Soluble |
|  |  | Ethyl acetate | — | Soluble | Soluble | Soluble | Soluble | Soluble | Soluble |
|  |  | Butyl acetate | — | Soluble | Soluble | Soluble | Soluble | Soluble | Soluble |

Example 15

A condensate solution was prepared by the same procedure as in Example 3, except for changing the type of silane compound to A-174 (3-methacryloxypropyl-trimethoxysilane), the amount of water introduced to 10.9 parts by weight (0.5 mol per mol of the hydrolyzable group in the silane compound), the amount of the diluting solvent introduced to 10.9 parts by weight, and the reaction time to 14 hours.

The results of weight average molecular weight, B/A ratio, ratio of remaining organic functional groups, and solubility in various solvents of the obtained condensate (siloxane resin) are shown in Table 2.

Example 16

A condensate solution was prepared by the same procedure as in Example 3, except for changing the type and amount of the silane compound introduced to A-174 (3-methacryloxypropyltrimethoxysilane) in an amount of 100 parts by weight and A-187 (3-glycidoxypropyl-trimethoxysilane) in an amount of 2 parts by weight, the amount of water introduced to 11.1 parts by weight (0.5 mol per mol of the hydrolyzable group in the silane compound), the amount of the diluting solvent introduced to 11.1 parts by weight, and the reaction time to five hours.

The results of weight average molecular weight, B/A ratio, ratio of remaining organic functional groups, and solubility in various solvents of the obtained condensate (siloxane resin) are shown in Table 2.

Example 17

A condensate solution was prepared by the same procedure as in Example 1, except for changing the type and amount of the silane compound introduced to A-174 (3-methacryloxypropyltrimethoxysilane) in an amount of 100 parts by weight and A-187 (3-glycidoxypropyl-trimethoxysilane) in an amount of 10 parts by weight, the amount of the catalyst introduced to 0.08 parts by weight (0.001 mol per mol of the hydrolyzable group in the silane compound), the amount of water introduced to 12.0 parts by weight (0.5 mol per mol of the hydrolyzable group in the silane compound), and the amount of the diluting solvent introduced to 12.0 parts by weight.

The results of weight average molecular weight, B/A ratio, ratio of remaining organic functional groups, and solubility in various solvents of the obtained condensate (siloxane resin) are shown in Table 2.

Example 18

A condensate solution was prepared by the same procedure as in Example 1, except for changing the type of silane compound to A-171 (vinyltrimethoxysilane), the amount of the catalyst introduced to 0.12 parts by weight (0.001 mol per mol of the hydrolyzable group in the silane compound), the amount of water introduced to 18.2 parts by weight (0.5 mol per mol of the hydrolyzable group in the silane compound), the amount of the diluting solvent introduced to 18.2 parts by weight, and the reaction time to ten hours.

The results of weight average molecular weight, B/A ratio, ratio of remaining organic functional groups, and solubility in various solvents of the obtained condensate (siloxane resin) are shown in Table 2.

Example 19

A condensate solution was prepared by the same procedure as in Example 1, except for changing the type and amount of the silane compound introduced to A-171 (vinyl-trimethoxysilane) in an amount of 100 parts by weight and A-187 (3-glycidoxypropyltrimethoxysilane) in an amount of 2 parts by weight, the amount of the catalyst introduced to 0.12 parts by weight (0.001 mol per mol of the hydrolyzable group in the silane compound), the amount of water introduced to 18.4 parts by weight (0.5 mol per mol of the hydrolyzable group in the silane compound), and the amount of the diluting solvent introduced to 18.4 parts by weight.

The results of weight average molecular weight, B/A ratio, ratio of remaining organic functional groups, and solubility in various solvents of the obtained condensate (siloxane resin) are shown in Table 2.

Example 20

A condensate solution was prepared by the same procedure as in Example 1, except for changing the type and amount of the silane compound introduced to A-171 (vinyltrimethoxysilane) in an amount of 100 parts by weight and A-187 (3-glycidoxypropyltrimethoxysilane) in an amount of 10 parts by weight, the amount of the catalyst introduced to 0.13 parts by weight (0.001 mol per mol of the hydrolyzable group in the silane compound), the amount of water introduced to 19.4 parts by weight (0.5 mol per mol of the hydrolyzable group in the silane compound), and the amount of the diluting solvent introduced to 19.4 parts by weight.

The results of weight average molecular weight, B/A ratio, ratio of remaining organic functional groups, and solubility in various solvents of the obtained condensate (siloxane resin) are shown in Table 2.

Example 21

A condensate solution was prepared by the same procedure as in Example 3, except for changing the type of silane compound to A-187 (3-glycidoxypropyl-trimethoxysilane), the amount of water introduced to 11.4 parts by weight (0.5 mol per mol of the hydrolyzable group in the silane compound), and the type and amount of the diluting solvent introduced to methanol in an amount of 11.4 parts by weight.

The results of weight average molecular weight, B/A ratio, ratio of remaining organic functional groups, and solubility in various solvents of the obtained condensate (siloxane resin) are shown in Table 2.

Example 22

A condensate solution was prepared by the same procedure as in Example 1, except for changing the type of silane compound to KBM-3063 (hexyltrimethoxysilane), the amount of the catalyst introduced to 0.08 parts by weight (0.001 mol per mol of the hydrolyzable group in the silane compound), the amount of water introduced to 13.1 parts by weight (0.5 mol per mol of the hydrolyzable group in the silane compound), the amount of the diluting solvent introduced to 13.1 parts by weight, and the reaction time to 12 hours.

The results of weight average molecular weight, B/A ratio, ratio of remaining organic functional groups, and solubility in various solvents of the obtained condensate (siloxane resin) are shown in Table 2.

Example 23

A condensate solution was prepared by the same procedure as in Example 22, except that 10 parts by weight (0.21 mol per mol of the hydrolyzable group in the silane compound) of epoxycyclohexane was added as a cyclic ether compound, and the reaction time was changed to three hours.

The results of weight average molecular weight, B/A ratio, ratio of remaining organic functional groups, and solubility in various solvents of the obtained condensate (siloxane resin) are shown in Table 2.

Example 24

A condensate solution was prepared by the same procedure as in Example 3, except for changing the amount of water introduced to 17.5 parts by weight (0.8 mol per mol of the hydrolyzable group in the silane compound), and the amount of the diluting solvent introduced to 17.5 parts by weight.

The results of weight average molecular weight, B/A ratio, ratio of remaining organic functional groups, and solubility in various solvents of the obtained condensate (siloxane resin) are shown in Table 2.

Example 25

A condensate solution was prepared by the same procedure as in Example 3, except for changing the amount of water introduced to 21.9 parts by weight (1.0 mol per mol of the hydrolyzable group in the silane compound), and the amount of the diluting solvent introduced to 21.9 parts by weight.

The results of weight average molecular weight, B/A ratio, ratio of remaining organic functional groups, and solubility in various solvents of the obtained condensate (siloxane resin) are shown in Table 2.

Example 26

A condensate solution was prepared by the same procedure as in Example 3, except for changing the reaction temperature to 50° C. and the reaction time to eight hours.

The results of weight average molecular weight, B/A ratio, ratio of remaining organic functional groups, and solubility in various solvents of the obtained condensate (siloxane resin) are shown in Table 2.

Example 27

A condensate solution was prepared by the same procedure as in Example 3, except for changing the reaction temperature to 70° C. and the reaction time to four hours.

The results of weight average molecular weight, B/A ratio, ratio of remaining organic functional groups, and solubility in various solvents of the obtained condensate (siloxane resin) are shown in Table 2.

Example 28

A condensate solution was prepared by the same procedure as in Example 3, except for changing the reaction temperature to 90° C.

The results of weight average molecular weight, B/A ratio, ratio of remaining organic functional groups, and solubility in various solvents of the obtained condensate (siloxane resin) are shown in Table 2.

Example 29

A condensate solution was prepared by the same procedure as in Example 3, except for changing the amount of water introduced to 6.6 parts by weight (0.3 mol per mol of the hydrolyzable group in the silane compound), the amount of the diluting solvent introduced to 6.6 parts by weight, and the reaction time to ten hours.

TABLE 2

|  |  |  |  | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| Con-densation reaction | Silane monomer | A-186 | pbw |  |  |  |  |  |  |  |  |
|  |  | A-174 | pbw | 100 | 100 | 100 |  |  |  |  |  |
|  |  | A-171 | pbw |  |  |  | 100 | 100 | 100 |  |  |
|  |  | A-187 | pbw |  | 2 | 10 |  | 20 | 10 | 100 |  |
|  |  | KBM-3063 | pbw |  |  |  |  |  |  |  | 100 |
|  | Cyclic ether | Epoxycyclo-hexane | pbw |  |  |  |  |  |  |  |  |
|  | Neutral salt | Sodium chloride | pbw | 0.07 | 0.07 | 0.08 | 0.12 | 0.12 | 0.13 | 0.07 | 0.08 |
|  |  | Lithium chloride | pbw |  |  |  |  |  |  |  |  |
|  |  | Cesium chloride | pbw |  |  |  |  |  |  |  |  |
|  |  | Potassium chloride | pbw |  |  |  |  |  |  |  |  |
|  |  | Potassium bromide | pbw |  |  |  |  |  |  |  |  |
|  |  | Potassium iodide | pbw |  |  |  |  |  |  |  |  |
|  |  | Magnesium chloride | pbw |  |  |  |  |  |  |  |  |
|  |  | Magnesium sulfate | pbw |  |  |  |  |  |  |  |  |
|  |  | Sodium sulfate | pbw |  |  |  |  |  |  |  |  |
|  |  | Tetrabutyl-ammonium chloride | pbw |  |  |  |  |  |  |  |  |
|  |  | Guanidium chloride | pbw |  |  |  |  |  |  |  |  |
|  | Water | Water | pbw | 10.9 | 11.1 | 12.0 | 18.2 | 18.4 | 19.4 | 11.4 | 13.1 |
|  |  | Cecium fluoride | pbw |  |  |  |  |  |  |  |  |
|  | Acid catalyst | Hydrochloric acid (0.01 mol/L) | pbw |  |  |  |  |  |  |  |  |
|  | Base catalyst | Aqueous sodium hydroxide (0.01 mol/L) | pbw |  |  |  |  |  |  |  |  |
|  | Diluting solvent | 1-Methoxy-2-propanol | pbw | 10.9 | 11.1 | 12.0 | 18.2 | 18.4 | 19.4 |  | 13.1 |
|  |  | Methanol | pbw |  |  |  |  |  |  | 11.4 |  |
|  | Reaction conditions | Reaction temperature | °C. | 130 | 130 | 130 | 130 | 130 | 130 | 130 | 130 |
|  |  | Reaction time | hr | 14 | 5 | 3 | 10 | 3 | 3 | 3 | 12 |
| Properties of con-densate | Weight average molecular weight |  | — | 2200 | 3200 | 2800 | 5200 | 3300 | 7300 | 2000 | 2300 |
|  | B/A ratio |  | — | ≤0.2 | ≤0.2 | ≤0.2 | ≤0.2 | ≤0.2 | ≤0.2 | ≤0.2 | ≤0.2 |
|  | Ratio of remaining organic functional groups |  | — | >0.95 | >0.95 | >0.95 | >0.95 | >0.95 | >0.95 | >0.95 | >0.95 |
|  | Solubility in various solvents | Methanol | — | Insoluble | Insoluble | Insoluble | Insoluble | Insoluble | Insoluble | Soluble | Insoluble |
|  |  | 2-Propanol | — | Insoluble | Insoluble | Insoluble | Insoluble | Insoluble | Insoluble | Soluble | Insoluble |
|  |  | 1-Methoxy-2-propanol | — | Soluble | Soluble | Soluble | Soluble | Soluble | Soluble | Soluble | Soluble |
|  |  | Acetone | — | Soluble | Soluble | Soluble | Soluble | Soluble | Soluble | Soluble | Soluble |
|  |  | Methyl ethyl ketone | — | Soluble | Soluble | Soluble | Soluble | Soluble | Soluble | Soluble | Soluble |
|  |  | Methyl isobutyl ketone | — | Soluble | Soluble | Soluble | Soluble | Soluble | Soluble | Soluble | Soluble |
|  |  | Ethyl acetate | — | Soluble | Soluble | Soluble | Soluble | Soluble | Soluble | Soluble | Soluble |
|  |  | Butyl acetate | — | Soluble | Soluble | Soluble | Soluble | Soluble | Soluble | Soluble | Soluble |

|  |  |  |  | Ex. 23 | Ex. 24 | Ex. 25 | Ex. 26 | Ex. 27 | Ex. 28 | Ex. 29 |
|---|---|---|---|---|---|---|---|---|---|---|
| Con-densation reaction | Silane monomer | A-186 | pbw |  | 100 | 100 | 100 | 100 | 100 | 100 |
|  |  | A-174 | pbw |  |  |  |  |  |  |  |
|  |  | A-171 | pbw |  |  |  |  |  |  |  |
|  |  | A-187 | pbw |  |  |  |  |  |  |  |
|  |  | KBM-3063 | pbw | 100 |  |  |  |  |  |  |
|  | Cyclic ether | Epoxycyclo-hexane | pbw | 10 |  |  |  |  |  |  |
|  | Neutral salt | Sodium chloride | pbw | 0.08 | 0.07 | 0.07 | 0.07 | 0.07 | 0.07 | 0.07 |
|  |  | Lithium chloride | pbw |  |  |  |  |  |  |  |
|  |  | Cesium chloride | pbw |  |  |  |  |  |  |  |
|  |  | Potassium chloride | pbw |  |  |  |  |  |  |  |
|  |  | Potassium bromide | pbw |  |  |  |  |  |  |  |
|  |  | Potassium iodide | pbw |  |  |  |  |  |  |  |
|  |  | Magnesium chloride | pbw |  |  |  |  |  |  |  |
|  |  | Magnesium sulfate | pbw |  |  |  |  |  |  |  |
|  |  | Sodium sulfate | pbw |  |  |  |  |  |  |  |

TABLE 2-continued

|  |  |  | pbw |  |  |  |  |  |  |  |
|---|---|---|---|---|---|---|---|---|---|---|
|  |  | Tetrabutyl-ammonium chloride | pbw |  |  |  |  |  |  |  |
|  |  | Guanidium chloride | pbw |  |  |  |  |  |  |  |
|  | Water | Water | pbw | 13.1 | 17.5 | 21.9 | 11.0 | 11.0 | 11.0 | 6.6 |
|  |  | Cecium fluoride | pbw |  |  |  |  |  |  |  |
|  | Acid catalyst | Hydrochloric acid (0.01 mol/L) | pbw |  |  |  |  |  |  |  |
|  | Base catalyst | Aqueous sodium hydroxide (0.01 mol/L) | pbw |  |  |  |  |  |  |  |
|  | Diluting solvent | 1-Methoxy-2-propanol | pbw | 13.1 | 17.5 | 21.9 | 11.0 | 11.0 | 11.0 | 6.6 |
|  |  | Methanol | pbw |  |  |  |  |  |  |  |
|  | Reaction conditions | Reaction temperature | °C. | 130 | 130 | 130 | 50 | 70 | 90 | 130 |
|  |  | Reaction time | hr | 3 | 3 | 3 | 8 | 4 | 3 | 10 |
| Properties of condensate | Weight average molecular weight |  | — | 2500 | 5200 | 7100 | 2200 | 2200 | 2200 | 1800 |
|  | B/A ratio |  | — | ≤0.2 | ≤0.2 | ≤0.2 | ≤0.2 | ≤0.2 | ≤0.2 | 0.4 |
|  | Ratio of remaining organic functional groups |  | — | >0.95 | >0.95 | >0.95 | >0.95 | >0.95 | >0.95 | >0.95 |
|  | Solubility in various solvents | Methanol | — | Insoluble | Insoluble | Insoluble | Insoluble | Insoluble | Insoluble | Insoluble |
|  |  | 2-Propanol | — | Insoluble | Insoluble | Insoluble | Insoluble | Insoluble | Insoluble | Insoluble |
|  |  | 1-Methoxy-2-propanol | — | Soluble | Soluble | Soluble | Soluble | Soluble | Soluble | Soluble |
|  |  | Acetone | — | Soluble | Soluble | Soluble | Soluble | Soluble | Soluble | Soluble |
|  |  | Methyl ethyl ketone | — | Soluble | Soluble | Soluble | Soluble | Soluble | Soluble | Soluble |
|  |  | Methyl isobutyl ketone | — | Soluble | Soluble | Soluble | Soluble | Soluble | Soluble | Soluble |
|  |  | Ethyl acetate | — | Soluble | Soluble | Soluble | Soluble | Soluble | Soluble | Soluble |
|  |  | Butyl acetate | — | Soluble | Soluble | Soluble | Soluble | Soluble | Soluble | Soluble |

Comparative Example 1

A condensate solution was prepared by the same procedure as in Example 1, except that sodium chloride was not used as the catalyst.

The results of weight average molecular weight, B/A ratio, ratio of remaining organic functional groups, and solubility in various solvents of the obtained condensate (siloxane resin) are shown in Table 3.

Comparative Example 2

A condensate solution was prepared by the same procedure as in Comparative Example 1, except for changing the reaction time to five hours.

The results of weight average molecular weight, B/A ratio, ratio of remaining organic functional groups, and solubility in various solvents of the obtained condensate (siloxane resin) are shown in Table 3.

Comparative Example 3

A condensate solution was prepared by the same procedure as in Comparative Example 1, except for changing the reaction time to ten hours.

The results of weight average molecular weight, B/A ratio, ratio of remaining organic functional groups, and solubility in various solvents of the obtained condensate (siloxane resin) are shown in Table 3.

Comparative Example 4

A condensate solution was prepared by the same procedure as in Comparative Example 1, except for changing the reaction time to 15 hours.

The results of weight average molecular weight, B/A ratio, ratio of remaining organic functional groups, and solubility in various solvents of the obtained condensate (siloxane resin) are shown in Table 3.

Comparative Example 5

A condensate solution was prepared by the same procedure as in Example 1, except that the type of catalyst was changed to hydrochloric acid (0.01 mol %) and no water was introduced.

The results of weight average molecular weight, B/A ratio, ratio of remaining organic functional groups, and solubility in various solvents of the obtained condensate (siloxane resin) are shown in Table 3.

Comparative Example 6

A condensate solution was prepared by the same procedure as in Example 1, except that the type of catalyst was changed to an aqueous sodium hydroxide solution (0.01 mol %), and no water was introduced.

The results of weight average molecular weight, B/A ratio, ratio of remaining organic functional groups, and solubility in various solvents of the obtained condensate (siloxane resin) are shown in Table 3.

Comparative Example 7

A condensate solution was prepared by the same procedure as in Comparative Example 2, except for changing the type of silane compound to A-187 (3-glycidoxypropyl-trimethoxysilane).

The results of weight average molecular weight, B/A ratio, ratio of remaining organic functional groups, and solubility in various solvents of the obtained condensate (siloxane resin) are shown in Table 3.

Comparative Example 8

A condensate solution was prepared by the same procedure as in Comparative Example 5, except for changing the type of silane compound to A-187 (3-glycidoxypropyltrimethoxysilane).

The results of weight average molecular weight, B/A ratio, ratio of remaining organic functional groups, and solubility in various solvents of the obtained condensate (siloxane resin) are shown in Table 3.

Comparative Example 9

A condensate solution was prepared by the same procedure as in Comparative Example 6, except for changing the type of silane compound to A-187 (3-glycidoxypropyltrimethoxysilane).

The results of weight average molecular weight, B/A ratio, ratio of remaining organic functional groups, and solubility in various solvents of the obtained condensate (siloxane resin) are shown in Table 3.

Comparative Example 10

A condensate solution was prepared by the same procedure as in Example 1, except for changing the type and amount of the catalyst introduced to cesium fluoride in an amount of 0.19 parts by weight, the amount of water introduced to 13.2 parts by weight (0.6 mol per mol of the hydrolyzable group in the silane compound), and the amount of the diluting solvent introduced to 13.2 parts by weight.

The results of weight average molecular weight, B/A ratio, ratio of remaining organic functional groups, and solubility in various solvents of the obtained condensate (siloxane resin) are shown in Table 3.

TABLE 3

| | | | | Com. Ex. 1 | Com. Ex. 2 | Com. Ex. 3 | Com. Ex. 4 | Com. Ex. 5 | Com. Ex. 6 |
|---|---|---|---|---|---|---|---|---|---|
| Condensation reaction | Silane monomer | A-186 | pbw | 100 | 100 | 100 | 100 | 100 | 100 |
| | | A-174 | pbw | | | | | | |
| | | A-171 | pbw | | | | | | |
| | | A-187 | pbw | | | | | | |
| | | KBM-3063 | pbw | | | | | | |
| | Cyclic ether | Epoxycyclohexane | pbw | | | | | | |
| | Neutral salt | Sodium chloride | pbw | | | | | | |
| | | Lithium chloride | pbw | | | | | | |
| | | Cesium chloride | pbw | | | | | | |
| | | Potassium chloride | pbw | | | | | | |
| | | Potassium bromide | pbw | | | | | | |
| | | Potassium iodide | pbw | | | | | | |
| | | Magnesium chloride | pbw | | | | | | |
| | | Magnesium sulfate | pbw | | | | | | |
| | | Sodium sulfate | pbw | | | | | | |
| | | Tetrabutylammonium chloride | pbw | | | | | | |
| | | Guanidium chloride | pbw | | | | | | |
| | Water | Water | pbw | 11.0 | 11.0 | 11.0 | 11.0 | | |
| | | Cecium fluoride | pbw | | | | | | |
| | Acid catalyst | Hydrochloric acid (0.01 mol/L) | pbw | | | | | | |
| | Base catalyst | Aqueous sodium hydroxide (0.01 mol/L) | pbw | | | | | 11.0 | 11.0 |
| | Diluting solvent | 1-Methoxy-2-propanol | pbw | 11.0 | 11.0 | 11.0 | 11.0 | 11.0 | 11.0 |
| | | Methanol | pbw | | | | | | |
| | Reaction conditions | Reaction temperature | °C. | 130 | 130 | 130 | 130 | 130 | 130 |
| | | Reaction time | hr | 3 | 3 | 3 | 3 | 3 | 3 |
| Properties of condensate | Weight average molecular weight | | — | 200 | 1300 | 8200 | 7900 | 2600 | 7500 |
| | B/A ratio | | — | ≤0.2 | ≤0.2 | ≤0.2 | ≤0.2 | ≤0.2 | ≤0.2 |
| | Ratio of remaining organic functional groups | | — | 0.8 | 0.7 | 0.6 | 0.5 | 0.2 | 0.8 |
| | Solubility in various solvents | Methanol | — | Soluble | Soluble | Soluble | Soluble | Soluble | Insoluble |
| | | 2-Propanol | — | Soluble | Soluble | Soluble | Soluble | Soluble | Insoluble |
| | | 1-Methoxy-2-propanol | — | Soluble | Soluble | Soluble | Soluble | Soluble | Soluble |
| | | Acetone | — | Soluble | Insoluble | Insoluble | Insoluble | Insoluble | Soluble |
| | | Methyl ethyl ketone | — | Soluble | Insoluble | Insoluble | Insoluble | Insoluble | Soluble |
| | | Methyl isobutyl ketone | — | Soluble | Insoluble | Insoluble | Insoluble | Insoluble | Soluble |
| | | Ethyl acetate | — | Soluble | Insoluble | Insoluble | Insoluble | Insoluble | Soluble |
| | | Butyl acetate | — | Soluble | Insoluble | Insoluble | Insoluble | Insoluble | Soluble |

| | | | | Com. Ex. 7 | Com. Ex. 8 | Com. Ex. 9 | Com. Ex. 10 |
|---|---|---|---|---|---|---|---|
| Condensation reaction | Silane monomer | A-186 | pbw | | | | 100 |
| | | A-174 | pbw | | | | |
| | | A-171 | pbw | | | | |
| | | A-187 | pbw | 100 | 100 | 100 | |
| | | KBM-3063 | pbw | | | | |
| | Cyclic ether | Epoxycyclohexane | pbw | | | | |

TABLE 3-continued

| | | | | | | | |
|---|---|---|---|---|---|---|---|
| | Neutral salt | Sodium chloride | pbw | | | | |
| | | Lithium chloride | pbw | | | | |
| | | Cesium chloride | pbw | | | | |
| | | Potassium chloride | pbw | | | | |
| | | Potassium bromide | pbw | | | | |
| | | Potassium iodide | pbw | | | | |
| | | Magnesium chloride | pbw | | | | |
| | | Magnesium sulfate | pbw | | | | |
| | | Sodium sulfate | pbw | | | | |
| | | Tetrabutylammonium chloride | pbw | | | | |
| | | Guanidium chloride | pbw | | | | |
| | Water | Water | pbw | 11.0 | | | 13.2 |
| | | Cecium fluoride | pbw | | | | 0.19 |
| | Acid catalyst | Hydrochloric acid (0.01 mol/L) | pbw | | | | |
| | Base catalyst | Aqueous sodium hydroxide (0.01 mol/L) | pbw | | 11.0 | 11.0 | |
| | Diluting solvent | 1-Methoxy-2-propanol | pbw | 11.0 | 11.0 | 11.0 | 13.2 |
| | | Methanol | pbw | | | | |
| | Reaction conditions | Reaction temperature | ° C. | 130 | 130 | 130 | 130 |
| | | Reaction time | hr | 3 | 3 | 3 | 3 |
| Properties of condensate | Weight average molecular weight | | — | 3300 | 1400 | 7800 | 9900 |
| | B/A ratio | | — | ≤0.2 | ≤0.2 | ≤0.2 | ≤0.2 |
| | Ratio of remaining organic functional groups | | — | 0.6 | 0.2 | 0.2 | 0.8 |
| Solubility in various solvents | | Methanol | — | Soluble | Soluble | Soluble | Insoluble |
| | | 2-Propanol | — | Soluble | Soluble | Soluble | Insoluble |
| | | 1-Methoxy-2-propanol | — | Soluble | Soluble | Soluble | Soluble |
| | | Acetone | — | Insoluble | Insoluble | Insoluble | Soluble |
| | | Methyl ethyl ketone | — | Insoluble | Insoluble | Insoluble | Soluble |
| | | Methyl isobutyl ketone | — | Insoluble | Insoluble | Insoluble | Soluble |
| | | Ethyl acetate | — | Insoluble | Insoluble | Insoluble | Soluble |
| | | Butyl acetate | — | Insoluble | Insoluble | Insoluble | Soluble |

In Examples 1 to 10 and 21, condensates soluble in various organic solvents were produced under conditions including a reaction temperature of 130° C. for three hours. The condensates soluble in various organic solvents were obtained in Examples 1 to 10 and 21 presumably because hydrolysis of epoxy groups did not occur due not only to the short reaction time but also to immediate condensation of the formed silanols so that the silanol groups existed in the system only for a short period of time.

It should be noted that the condensates of Examples 1 to 10 were insoluble in methanol and 2-propanol presumably because of a decrease in solubility associated with the increase in molecular weight, while the condensate obtained in Example 21 was soluble in methanol and 2-propanol presumably due to the high polarity of the glycidyl ether group.

In Comparative Example 1 in which no neutral salt was used, the condensation hardly proceeded in three hours. However, the reaction product was soluble in various organic solvents because it had a low molecular weight due to lack of hydrolysis and condensation.

In Comparative Examples 2 to 4 in which the reaction was carried out only in the presence of water, progress of the condensation (increase in molecular weight) was observed by prolonging the reaction time to five hours or longer. The obtained condensates, however, were insoluble in various organic solvents. This is presumably because the absence of catalysts resulted in insufficient condensation activity of silanols so that the silanols existed in the system for a long period of time and thus hydrolyzed epoxy groups to give a highly polar condensate. This presumption is considered reasonable because the condensates were soluble in highly hydrophilic alcohols.

In Examples 11 and 12 in which a silane compound containing a cyclic ether group was used but the anion of the neutral salt used was a sulfate ion, not a halogen, the catalytic activity was slightly inferior and a longer reaction time was needed to obtain a condensate than in the other examples.

Comparison between Examples 15 to 17 and between Examples 18 to 20 shows that the reaction was accelerated when the starting silane compound (B) included 1 mol % or more of a silane compound containing a cyclic ether group.

Comparison between Examples 22 and 23 shows that even the reaction of a silane compound not containing a cyclic ether group was accelerated by incorporation of a hydrocarbon containing a cyclic ether group.

In Examples 26 to 28 in which the reaction temperature was reduced to 50° C., 70° C., and 90° C., respectively, as compared to that in Example 3, a longer reaction time was needed at the low reaction temperatures 50° C. and 70° C.

At reaction temperatures of 90° C. or higher, on the other hand, the reaction time did not become any shorter. This is presumably because the temperature in the system increases only up to a certain level because the methanol or other solvents formed in the hydrolysis reflux.

In Example 29 in which the amount of water was reduced to 0.3 mol per mol of the hydrolyzable group in the silane compound as compared to that in Example 3, the obtained condensate was comparable, but the GPC chart shows that unreacted monomers had remained in the condensate.

In Comparative Example 5 in which an acid catalyst was used, epoxy groups were hydrolyzed to give a product insoluble in various organic solvents, even though the reaction time was three hours.

In Comparative Example 6 in which a base catalyst was used, on the other hand, the resulting condensate was soluble in various organic solvents. This is presumably because the epoxy group in A-186, which was an alicyclic epoxy group, had high hydrolysis resistance under basic conditions.

However, in Comparative Examples 7 to 9, the condensate synthesized in the presence of a base catalyst, as well as those synthesized in the absence of catalysts or in the presence of an acid catalyst, were insoluble in various organic solvents. This is presumably because the use of a silane compound containing a glycidyl ether group with lower hydrolysis resistance (A-187) than an alicyclic epoxy group (A-186) resulted in hydrolysis of the epoxy group during the reaction, thus producing a highly polar condensate. That is, the results are considered to suggest that with the present catalytic system, a condensate can be produced even from a silane compound containing an organic substituent (e.g. epoxy group) which is less likely to be hydrolyzed and condensed with an acid or base catalyst usually used as a catalyst in a sol-gel method.

In Comparative Example 10, a condensate readily soluble in various organic solvents was successfully produced; however, the inner wall of the glass reaction vessel after the reaction had an appearance like that of frosted glass, which suggests generation of hydrogen fluoride.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

The invention claimed is:

1. A method for producing a siloxane resin, comprising:
hydrolyzing and condensing a silane compound containing a hydrolyzable silyl group represented by formula (I) using a salt formed from a strong acid and a strong base as a catalyst,
the formula (I) being $R_nSiX_{4-n}$,
wherein R represents an organic group having a carbon atom directly bonded to Si; X represents a hydroxyl group or a hydrolyzable group; and n represents an integer of 0 to 3, provided that when n is 2 or greater, each R is the same as or different from each other, and when (4-n) is 2 or greater, each X is the same as or different from each other.

2. The method for producing a siloxane resin according to claim 1, wherein the salt is a salt formed by combining a cation selected from the group consisting of Group 1 element ions, Group 2 element ions, tetraalkylammonium ions, and guanidium ions with an anion selected from the group consisting of sulfate ions, nitrate ions, perchlorate ions, and Group 17 element ions excluding fluoride ions.

3. The method for producing a siloxane resin according to claim 2, wherein the cation is the Group 1 element ion or the Group 2 element ion, and the anion is a chloride ion, a bromide ion, or an iodide ion.

4. The method for producing a siloxane resin according to claim 3, wherein R is an organic group containing a cyclic ether group.

5. The method for producing a siloxane resin according to claim 3, the method further comprising adding a cyclic ether compound.

6. The method for producing a siloxane resin according to claim 3, the method further comprising adding an alcohol or an ether as a diluting solvent.

7. The method for producing a siloxane resin according to claim 2, wherein R is an organic group containing a cyclic ether group.

8. The method for producing a siloxane resin according to claim 2, the method further comprising adding a cyclic ether compound.

9. The method for producing a siloxane resin according to claim 2, the method further comprising adding an alcohol or an ether as a diluting solvent.

10. The method for producing a siloxane resin according to claim 1, wherein R is an organic group containing a cyclic ether group.

11. The method for producing a siloxane resin according to claim 10, the method further comprising adding a cyclic ether compound.

12. The method for producing a siloxane resin according to claim 10, the method further comprising adding an alcohol or an ether as a diluting solvent.

13. The method for producing a siloxane resin according to claim 1, the method further comprising adding a cyclic ether compound.

14. The method for producing a siloxane resin according to claim 13, the method further comprising adding an alcohol or an ether as a diluting solvent.

15. The method for producing a siloxane resin according to claim 1, the method further comprising adding an alcohol or an ether as a diluting solvent.

16. The method for producing a siloxane resin according to claim 15, wherein the diluting solvent is a water-soluble alcohol or a water-soluble ether.

17. The method for producing a siloxane resin according to claim 1, the method further comprising heating a reaction mixture to a temperature of 40° C. to 200° C.,
wherein the reaction mixture comprises the silane compound at a concentration of 90% by mass or less in a reaction system,
wherein the reaction system comprises 0.4 to 10 mol of water per mol of the hydrolyzable silyl group of the silane compound and 0.000001 to 0.1 mol of the salt per mol of the hydrolyzable silyl group of the silane compound, and
wherein the siloxane resin has a polystyrene equivalent weight average molecular weight of 500 to 30000.

18. The method for producing a siloxane resin according to claim 1, wherein a ratio of a molar amount of SiX remaining after the condensing to an initial molar amount of SiX is ≤0.2, wherein the molar amount of SiX remaining after the condensing does not contribute to the condensing.

* * * * *